US008984482B2

(12) United States Patent
Morton et al.

(10) Patent No.: US 8,984,482 B2
(45) Date of Patent: Mar. 17, 2015

(54) ABSTRACTING REQUEST FROM A DEVELOPMENT ENVIRONMENT TO OBJECT MODEL

(75) Inventors: Michael William Morton, Woodinville, WA (US); Vladimir Yuryevich Morozov, Sammamish, WA (US); Iouri Borisovitch Simernitski, Redmond, WA (US); Karim Jouini, Toulouse (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 1421 days.

(21) Appl. No.: 12/331,094

(22) Filed: Dec. 9, 2008

(65) Prior Publication Data

US 2010/0145966 A1 Jun. 10, 2010

(51) Int. Cl.
*G06F 9/44* (2006.01)

(52) U.S. Cl.
CPC .................................. *G06F 8/36* (2013.01)
USPC ................................... 717/121; 717/122

(58) Field of Classification Search
USPC ................... 717/100, 120, 121, 122
See application file for complete search history.

(56) References Cited

U.S. PATENT DOCUMENTS

| 6,112,024 | A | 8/2000 | Almond |
| 6,928,637 | B2 | 8/2005 | Leherbauer |
| 6,993,759 | B2 | 1/2006 | Aptus |
| 7,051,015 | B1* | 5/2006 | Street et al. ............... 707/999.01 |
| 7,139,999 | B2 | 11/2006 | Bowman-Amuah |
| 7,150,007 | B2* | 12/2006 | Ionescu .......................... 717/125 |
| 7,822,708 | B1* | 10/2010 | Mathew et al. ............... 707/610 |
| 2003/0145315 | A1* | 7/2003 | Aro et al. ....................... 717/170 |
| 2005/0149915 | A1* | 7/2005 | Wu et al. ........................ 717/137 |
| 2006/0005177 | A1* | 1/2006 | Atkin et al. .................... 717/151 |
| 2006/0190624 | A1* | 8/2006 | Kegoya et al. ................ 709/246 |
| 2007/0300141 | A1* | 12/2007 | Barrett et al. .................. 715/500 |
| 2008/0033920 | A1* | 2/2008 | Colclasure et al. ............... 707/3 |
| 2008/0092115 | A1* | 4/2008 | Borgsmidt et al. ........... 717/108 |
| 2008/0127046 | A1* | 5/2008 | Mitchell et al. ............... 717/104 |
| 2008/0201700 | A1* | 8/2008 | Quinn et al. ................... 717/168 |

OTHER PUBLICATIONS

"Convert a Sub-Site to a Site Collection", 2007, http://stsadm.blogspot.com/2007/09/convert-sub-site-to-site-collection.html.
"Sourcegear"; Sourcegear LLC. Copyright 1997-2008 http://www.sourcegear.com/vault Retrieved date: Sep. 22, 2008 p. 1.

(Continued)

*Primary Examiner* — James D Rutten
*Assistant Examiner* — Bradford Wheaton
(74) *Attorney, Agent, or Firm* — Kevin Sullivan; Kate Drakos; Micky Minhas (57) ABSTRACT

Techniques and a graphical user interface for abstracting a request from a development environment to an object model of an object store are disclosed herein. A request for data is made by the development environment, and the request is abstracted to make in compatible with the object model (e.g., by negating properties related to bitness, versioning, etc.). The request is transmitted to a broker process that retrieves a method and/or data commands corresponding to the request. The broker process may also decode one or more method parameters of the request. If one or more method parameters are not compatible with the object model, an adapter may be loaded into the object model to make the object model compatible with the request. The broker process may also transmit the method, data commands, and/or request to the object model wherein the request is fulfilled by the object model.

20 Claims, 5 Drawing Sheets

(56) References Cited

OTHER PUBLICATIONS

"Perforce for Windows for x86 and x64"; Start 64! http://www.start64.com/index.php?option=com_content&task=view&id=2053&Itemid=74 Dated: Apr. 30, 2008 pp. 1-3.

Campbell, Steve; "Thoughts on Component Isolation for Paint.net v4.0"; http://blog.getpaint.net/2008/03/16/thoughts-on-component-isolation-for-paintnet-v40/ Dated: Mar. 16, 2008 pp. 1-4.

"JBuilder"; http://web.archive.org/web/20080915163226/http://www.hallogram.com/jbuilder/index.html Dated: Sep. 15, 2008 pp. 1-8.

"Plan the Structure of Site Collections Sites"; Microsoft Coporation Copyright 2008. http://office.microsoft.com/en-us/sharepointserver/HA102560511033.aspx Retrieved Date: Sep. 23, 2008 pp. 1-5.

* cited by examiner

ABSTRACTING REQUEST FROM A DEVELOPMENT ENVIRONMENT TO OBJECT MODEL

BACKGROUND

Software developers frequently use development environments to assist them in developing console applications, graphical user interface applications, websites, and/or web services, for example. Often times, portions of the code used to build applications, for example, may be based upon previously written code for a similar application. Therefore, rather than develop the code from scratch, developers may call into existing code to reuse existing functionality.

Previously written code may be stored in an object store (e.g., a central collaboration server), and an object model may provide a structured object-oriented representation of the codes. An object model may also provide methods for retrieving objects and/or elements of the object from the object store, setting properties of the objects, and/or adding/deleting objects, for example. When a developer wants to retrieve previously written code, the developer runs the object model and initializes an object that retrieves relevant content (e.g., codes) related to the object.

Unfortunately, several problems make it difficult for a development environment and an object model to achieve interoperability. For example, the development environment may target a 32-bit processor architecture and an object model may target a 64-bit processor architecture. Therefore, code cannot be easily transferred between the development environment and the object model because their respective processor architectures are incompatible (e.g., the process may fail because of bitness conflicts). Additionally, code that allows communication between the object model and development environment may be version specific. Therefore, if either the version of the object model or the version of the development environment changes, the code that provides the communication channel between the development environment and the object model may have to be rewritten.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to a first aspect, a method for establishing a communication channel between a development environment and an object store is provided. The method comprises generating a request in the development environment, the generated request configured to retrieve data from the object store. The method also comprises neutralizing one or more properties of the generated request. For example, the development environment may target a 32-bit processor architecture, and the request may be neutralized so that it is compatible with an object model, associated with the object store, that targets a 64-bit processor architecture. The method may further comprise retrieving a method corresponding to the generated request and loading a first adapter into the object model associated with the object store to establish the communication channel between the development environment and the object store. The adapter may correspond to one or more method parameters of the generated request. For example, the request may be configured to operate with a specific version of the object model, and the adapter may alter the object model if it comprises a version other than the specified version so that the request is compatible with the object model.

According to another aspect, a system for abstracting request from a development environment to an object model of an object store is provided. The development environment is configured to retrieve a request, the request comprising an identification tag and method parameters for retrieving data from the object store. The system also comprises an abstraction component configured to abstract one or more properties of the request, and a broker configured to retrieve a method corresponding to the identification tag and decode the method parameters into corresponding data types. The system further comprises an add-in component configured to add an adapter to the object model based upon the decoded method parameters.

According to another aspect, a graphical user interface is provided. The graphical user interface comprises a multi-facetted window in a development environment targeting a first processor architecture, wherein nodes may be selected and deselected, selected nodes displaying data stored in an object store targeting a second processor architecture. The first processor architecture different from the second processor architecture.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Figure 1:
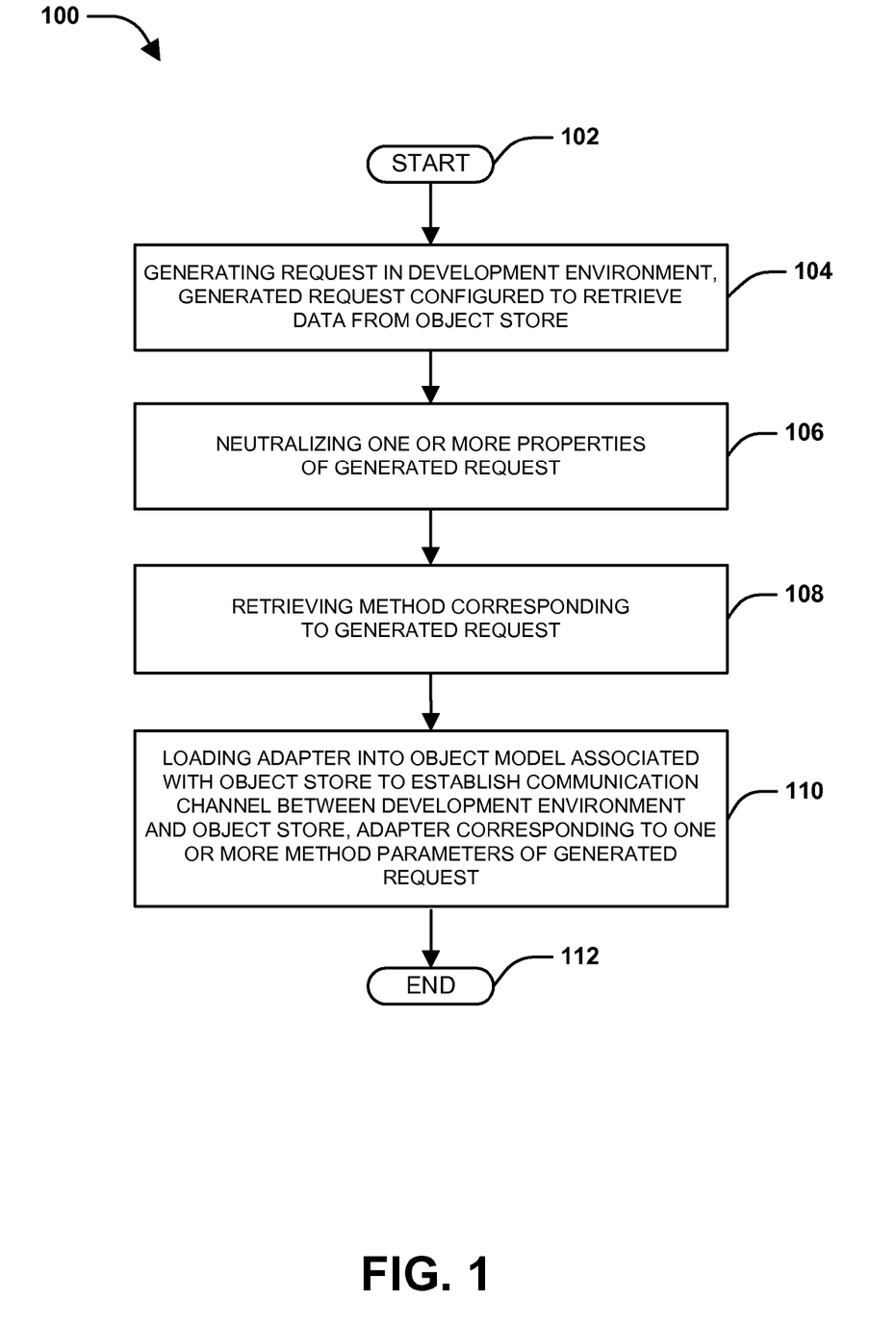
FIG. 1 is a flow chart illustrating an exemplary method of establishing a communication channel between a development environment and an object store.

Turning initially to FIG. 1, an exemplary methodology 100 is illustrated for establishing a communication channel between a development environment and an object store. The established communication channel may provide a means for sending data retrieval request from the development environment to an object model of the object store. Once the object model has performed the request and determined relevant data comprised within the object store, the established communication channel may also provide a means for transporting the relevant data from the object store to the development environment.

The method 100 begins at 102, and a request is generated in the development environment at 104. In one embodiment, the request is generated when user input is received into an explorer window of the development environment. The generated request may be configured to retrieve data from the object store and may comprise method parameters and/or an identification tag corresponding to a method for retrieving data from the object store. For example, the request may comprise method parameters that limit the scope of a query of the object store (by the object model). The request may also comprise method parameters related to the object store (e.g., version specifications of the object store that the request is compatible with).

The generated request may have properties similar to the operating environment of the development environment (e.g., to make it compatible with the development environment. For example, the generated request may be configured to operate on a processor architecture similar to the development environment (e.g., a 32 bit-process) and/or versioning properties similar to the development environment (e.g., so that the request is compatible with the version of the development environment being used).

In one embodiment, one or more pre-defined requests (e.g., with pre-defined parameters and/or pre-defined identification tags) are stored in a database associated with the development environment, and a request is retrieved from the database when a node, associated with the retrieved request (and displayed on a user interface portion of the explorer window), is selected. That is, the request may be built by a third-party developer (e.g., a developer other than the user, developers that developed the development environment, developers that develop programs compatible with the development environment, etc.) and retrieved when a related node (created by the third-party developer and connected to the request) is selected. It will be understood to those skilled in the art that the method parameters may also be a function of the user input. For example, the request may comprise one or more method parameters related to a keyword or type of data the user may desire to be retrieved from the object store. In this way, the request may be customized by the user so that the retrieved data is more relevant to the user.

At 106, one or more method parameters of the generated request are neutralized (e.g., abstracted, made substantially agnostic, etc.). That is, parameters that may limit the ability of the development environment and the object model to communicate may be discarded, altered, or otherwise negated to allow the request to be transferred from the development environment to the object model. For example, parameters related to versioning and/or processor architecture (e.g., parameters that are not directly or substantially related to the data retrieval) may be neutralized to allow a request that is not compatible with object model (e.g., the request was made in 32-bit because the development environment targets (e.g., is executed on) a 32-bit processor architecture, but the object model targets a 64-bit processor architecture) to become compatible with it.

At 108, a method corresponding to the generated request is retrieved. In one example, the request is transmitted from the development environment to broker process once one or more properties of the generated request have been neutralized. The broker process (a 64-bit process) may retrieve the method based upon an identification tag corresponding to a particular method (comprising data commands related to the request). For example, a plurality of methods may be comprised in a database associated with the broker process, and the broker process may retrieve a method from the database that corresponds to identification tag. It will be appreciated that where the identification tag does not correspond to a particular method, the broker process may retrieve a general method (e.g., an execute command method) and data commands may be added later (by the broker process). It will also be appreciated that the bitness of the retrieved method may be a function of the processor architecture of the object model (e.g., 64-bit).

The method may be linked to the parameters of the request. For example, if the request comprises version specifications (e.g., version specifications relating to the object model and comprised in the request may be decoded and linked to the retrieved method). In one example, one or more method parameters of the request are decoded into specific .NET types before the parameters are linked to the retrieved method.

In one embodiment, each method corresponds to a node on the user interface of the explorer window. Thus, a third party developer can build a request (and corresponding node) and a method. In one example, the request is stored in a database associated with the development environment and is designed to be compatible with the development environment (e.g., 32-bit processor architecture), and the method is stored in a database associated with the broker process and is designed to be compatible with the object model (e.g., 64-bit processor architecture).

At 110, a first adapter is loaded into the object model associated with the object store to establish the communication channel between the development environment and the object store. The loaded adapter may correspond to one or more method parameters of the generated request, and may be configured to allow the object model to receive a request that may be otherwise incompatible with the object model. For example, the request may be designed to operate with a specified version of the object model, and the broker process may load an adapter into the object model (e.g., add a plug-in to a newer version of the object model) corresponding to the specified version. In this way, a request designed to operate with a particular version or versions of the object model may continue to operate if the object model is changed (e.g., updated). Therefore, a third-party developer, for example, may not have to modify the request based upon changes in the object model. Not modifying the request when changes are made to the object model may save the third-party developer time and/or encourage the builder to build more requests (because the request may be useful for a longer period of time), for example.

Once the adapter is loaded, the method and/or linked request parameters may be transferred to the object model and the object model may execute the retrieved method. That is, the object model may retrieve data from the object store that is relevant to the request using the method (e.g., data commands). For example, if the request was for code relating to "fields," the object model may query the object store (based upon parameters of the request) and retrieve code related to text fields that users (e.g., collaborators that store code in the object store) had previously stored in the object store.

It will be appreciated that where the retrieved method is a general method (e.g., a method comprising very few data commands), another database may comprise additional data commands specific to the request. In one example, this technique (of using a general method and a database of data commands) allows additional features to be later (e.g., after the broker process is shipped) added to broker process. That is, methods that are not available when the broker process is shipped (e.g., sold), for example, may be later added to a data command database. For example, developers of the broker process (e.g., those owning proprietary rights to the object model) may bundle a certain number of methods, designed with data commands for specific request, to the broker process. One or more of the bundled methods may be general methods that allow future data commands to be added by either the developers of the broker process and/or other developers, for example.

In one embodiment, third party developers (e.g., developers of the broker process and/or other developers) may write data commands (after the broker process is shipped) and write related request (for the development environment). The request may be stored in a database associated with the development environment and the data commands may be stored in a database associated with the broker process. It will be understood to those skilled in the art that while the techniques herein described provided a communication channel between that development environment and the object model (that does not have to be updated when the object model and/or the development environment changes) third party developers may have to update the data command when the object model is updated (e.g., a new version is released) and/or update the request when the development environment is update.

Once the relevant data is retrieved from the object store by the object model, the data is transmitted through the communication channel from the object store to the development environment. It will be appreciated that properties of the data may be altered to allow the data to be received by the development environment. For example, the data may be serialized into a processor architecture neutral format if the object store (or object model) and the development environment have different process architectures, and/or the data may de-serialized into a version-compatible format corresponding to version characteristics of the development environment. The method ends at 112.

It will be understood to those skilled in the art that once an adapter is loaded into the object model, a second request comprising similar method parameters as the first request may utilize the first adapter. That is, the acts of generating, neutralizing, and retrieving may be repeated, but the act of loading may not be repeated since the object model (with the previously loaded adapter) is compatible with the second request. It will be appreciated that where the second request is not compatible with the object model, a second adapter, corresponding to one or more method parameters of the second request may be loaded.

Figure 2:
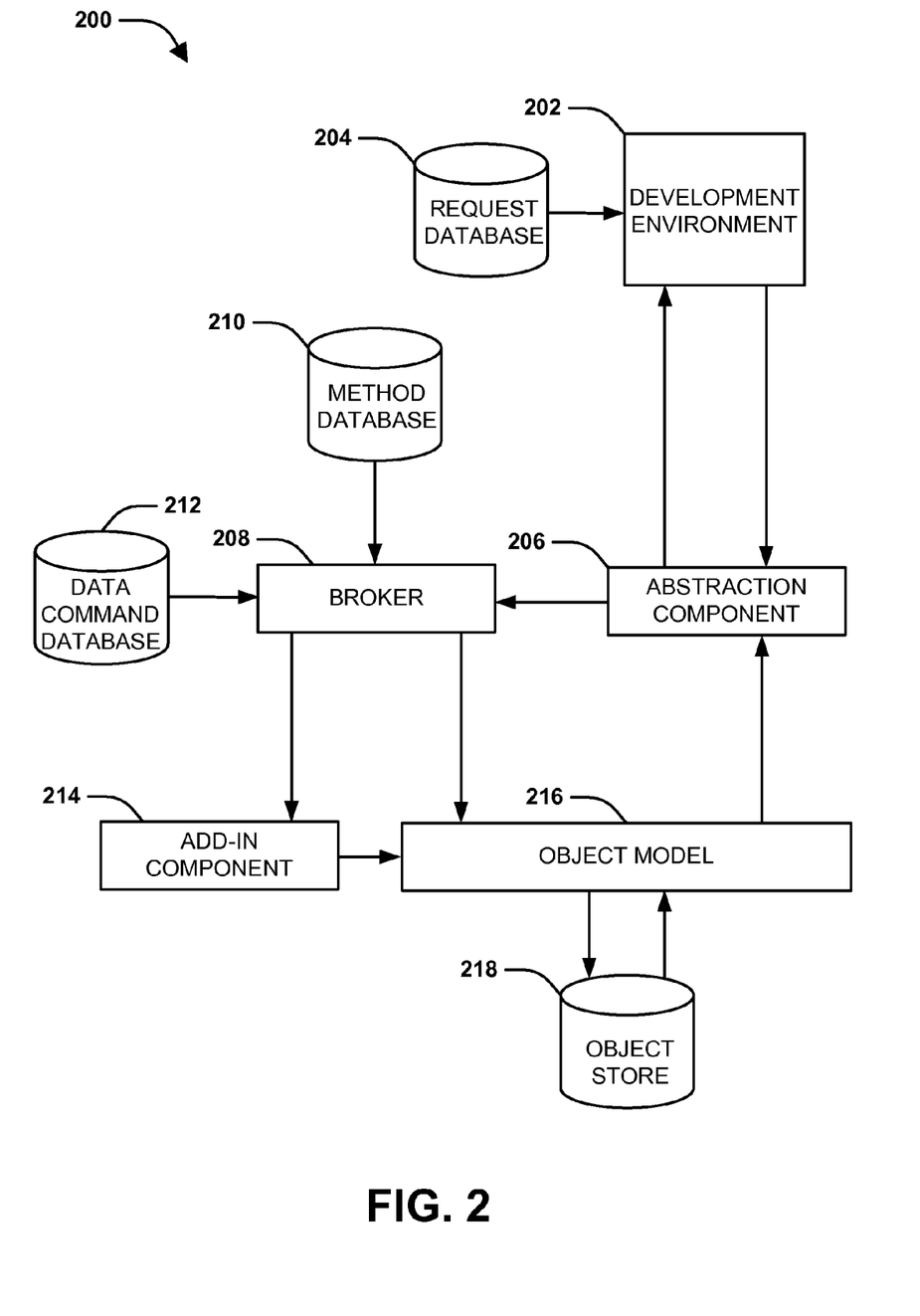
FIG. 2 is a component block diagram illustrating an exemplary system for abstracting request from a development environment to an object model of an object store.

FIG. 2 illustrates an exemplary system 200 for abstracting request from a development environment 202 (e.g., Visual Studio®) to an object model 216 of an object store 218 (e.g., SharePoint®). In this way, a communication channel from the development environment to the object model may be established. It will be appreciated that the established communication channel may continue to be operable if changes (e.g., updates) are made to the development environment and/or the object model.

The development environment 202 is configured to retrieve a request from a request database 204. In one embodiment, the development environment 202 comprises a user interface, and the request is retrieved when a node (in the user interface) is selected. The request may comprise method parameters and/or an identification tag related to a method for retrieving data from the object store 218. For example, the request may comprise method parameters related to a version of the object model the request is compatible with. The request may also comprise properties related to the development environment. For example, the request may comprise properties related to a processor architecture of the development environment and/or versioning of the development environment.

It will be appreciated that the retrieved request may be altered (e.g., data added) based upon user input. That is, a user of the development environment may create method parameters that limit a query of the object store 218, for example. For example, objects and/or codes stored within the object store 218 may be tagged with relevant keywords (by the people who stored the objects and/or codes in the object store), and the user may limit the query to objects and/or codes comprising a desired keyword by adding one or more method parameters to the request.

The request may be sent to an abstraction component 206 that is in operable communication with the development environment 202 and configured to abstract the request. As used herein, the term "abstract" is used broadly to describe a process configured to reduce and/or factor out properties of the request using a suitable analytic, iterative, or other abstraction technique. In one embodiment, the abstraction component 206 encodes the request in a version and processor architecture neutral way (e.g., removing, discarding, or otherwise negating properties of the request related to the development environment). It will be appreciated that the abstraction component 206 may be part of the development environment 202 and/or operate independent of the development environment 202.

It will be understood to those skilled in the art that by negating properties of the request, the request may be compatible with components that comprise other properties. In one example, the development environment 202 may be a 32-bit process and the object model 216 may be a 64-bit process. The abstraction component 206 may remove properties related to bitness, for example, so that the request may be transferred from the 32-bit development environment 202 to the 64-bit object model.

The abstracted request may be transmitted to a (64-bit processor) broker 208 that is in operable communication with the abstraction component 206 and configured to retrieve a method from a method database 210 based upon the abstracted request. For example, the request may comprise an identification tag relating to a specified method and the broker 208 may retrieve a method that corresponds to the identification tag from the method database 210. It will be appreciated that where the broker 208 is unable to retrieve a method relating to the request, the broker may retrieve a generic method (e.g., an "execute command" method) from the method database 210.

Where a generic method is retrieved from the method database 210, the broker 208 may also retrieve data commands related to the request from the data command database 212. It will be appreciated that the data command database 212 may provide the system with extensibility, for example. That is, a plurality of request and related methods (with data commands) may be built by the product developers (e.g., the developers that build the development environment and/or the object model) and additional request (and related data commands) may be built later (e.g., after the plurality of request and related methods are built). Rather than the build a method for an additional request built by a third-party developer (e.g., product developers and/or developers not associated with developing the development environment and/or object model) may build data commands related to the additional request, store the data commands in the data command database 212, and utilize a general method. In one example, building data commands, rather than the method, may require less programming and/or save the third-party developer time.

It will be appreciated that here, as elsewhere in this disclosure, "database" is used to refer to a store of data, and not to a particular computer system, software, architecture, schema, format, etc. for holding such information. The database may also comprise a plurality of replicated databases configured to store the same data for redundancy and improved performance in access, a plurality of databases configured to store different sets of data or different portions of a set of data and/or any other type of data storage mechanism (e.g., not necessarily limited to databases).

If the request is not compatible with the object model 216 (e.g., because a method parameter of the request corresponds to a version the object model 216 different that than what is currently used), the broker may notify an add-in component 214. The add-in component 214 may be configured to add an adapter (e.g., plug-in), corresponding to one or more of the method parameters of the request that are not compatible with the object model 216, to the object model 216. In this way, a request that was not designed for the object model being used may be received and processed, for example, by the object model 216. For example, if the current object model is version 5.0 and the request was designed for version 4.5, the add-in component 214 may add an adapter to the current object model to make the request compatible with the object model 216.

Once the request is compatible with the object model 216, the request, method, and/or data commands may be transmitted from the broker 208 to the object model 216. The object model 216 may execute the method and/or data commands and retrieve relevant data from the object store 218 based upon the request. For example, the request may specify to retrieve data related to building textboxes, and the object model 216 may conduct a query based upon the request and retrieve data relevant to building textboxes.

Retrieved data is transmitted from the object model 216 to the development environment 202. It will be appreciated that the retrieved data may be altered as it is transmitted from the object model 216 to the development environment 202 (e.g., to account for differences in the processor architecture the object model 216 targets and the processor architecture the development environment 202 targets). In one embodiment, the abstraction component 206 serializes the retrieved data into a processor architecture neutral format and then de-serializes the data into a versioning format compatible with the development environment 202.

It will be understood to those skilled in the art that techniques described herein may provide several advantages over current techniques. For example, using current techniques, a developer that wants to retrieve data from an object store through a development environment has to build the communication channel between the development environment and an object model related to the object store. When changes are made to either the development environment or the object model, the communication channel is broken and the developer has to rebuild the communication channel. However, using the techniques herein disclosed, the communication channel is not broken by the changes. Therefore, instead of rebuilding the communication channel, the developer may rebuild the request if the development environment 202 is changed and/or rebuild the data commands if the object model 216 is changed.

Additionally, the techniques herein disclosed overcome problems caused when an object model and a development environment target different processor architectures. Current techniques do not provide a practical and/or effective means of communicating between a development environment that targets a 32-bit processor architecture and an object model that targets a 64-bit processor architecture, for example. However, by abstracting request from the development environment and storing methods and/or data commands in an object model compatible format (e.g., 64-bit format), the object model and the development environment may communicate despite targeting different processor architectures.

Figure 3:
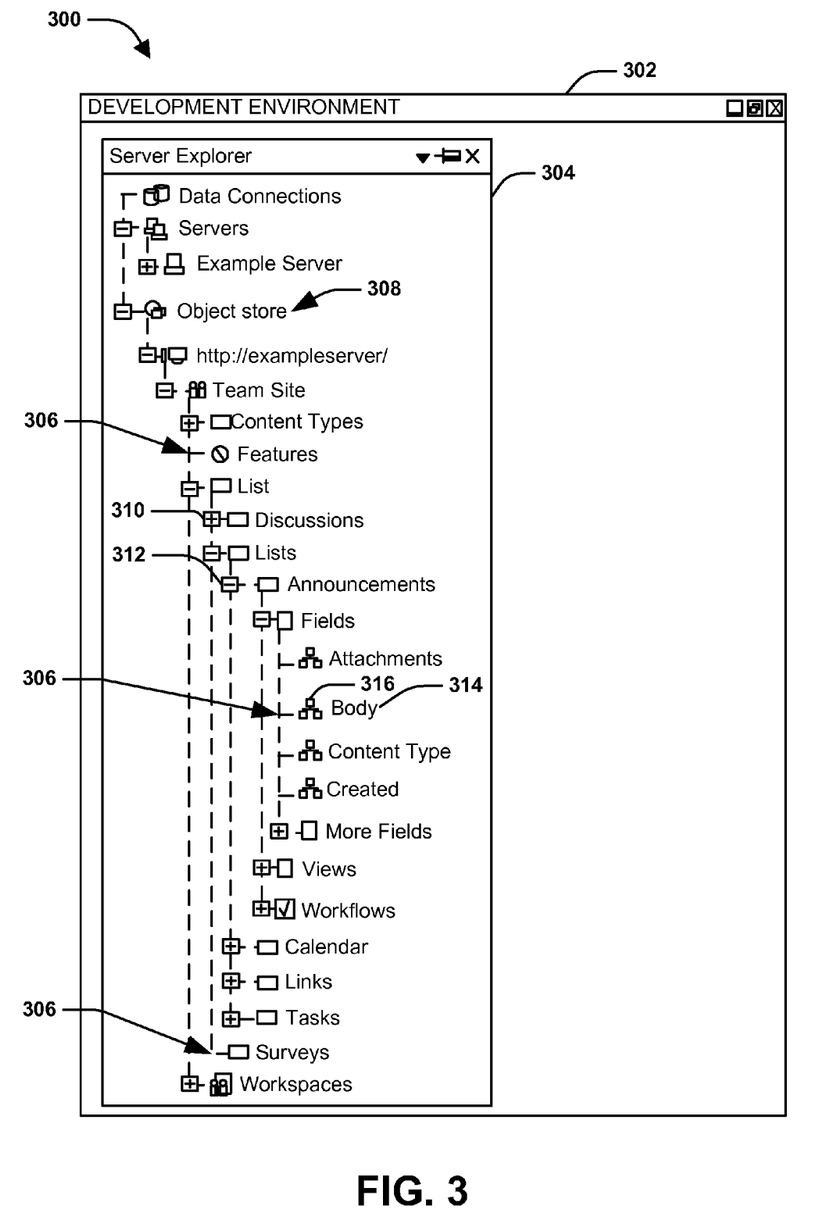
FIG. 3 illustrates an exemplary graphical user interface for displaying content of an object store in a development environment.

FIG. 3 illustrates an exemplary graphical user interface 300 for displaying content of an object store 308 in a development environment interface 302. In one embodiment, the development environment 302 and the object store have conflicting properties that may make it difficult for the development environment to determine data stored in the object store. For example, the development environment may target a first processor architecture (e.g., a 32-bit processor architecture) and the object store may target a second processor architecture (e.g., a 64-bit processor architecture), making it difficult for the development environment and object store to share data.

The graphical user interface 300 comprises a multi-facetted window 304 configured to display nodes 306 related to data stored in the object store 308. It will be understood to that the term "multi-facetted" is used herein in a broad sense to describe a window capable of changing (e.g., enlarging, shrinking, stretching, being move to another portion of a computer screen, etc.). The nodes 306 may represent data comprised in the object store and may be selected and deselected (e.g., making the node active and/or focused on to allow data to be retrieved from the object store). Further, when a node is expanded (e.g., by selecting a (+) symbol 310 situated nearby the node), additional nodes may be displayed representing additional data in the object store, or rather a sub-set of data represented by the expanded node, for example. When a node is collapsed or unexpanded (e.g., by selecting a (−) symbol 312 situated nearby the node), a set of nodes may be collapsed (e.g., removed from the multi-facetted window) and the data related to the collapsed nodes may be represented the by deselected node, for example. It will be appreciated that other techniques for expanding and/or collapsing nodes are also contemplated. For example, nodes may be expanded and/or unexpanded when input is received from a keyboard (e.g., a user selects the left and/or right arrow keys and input is received based upon the selection).

In the illustrated example, the nodes 306 comprise text 314 and small graphical images 316 (e.g., furthering illustrating the type(s) of data represented by the node). However, it will be appreciated that the nodes 306 may comprise different indicators and/or symbols. For example, different types of data may be represented by different colors, shapes, or other suitable graphical indicator.

It will be understood to those skilled in the art that nodes other than those illustrated in the example graphical user interface 300 are contemplated. It will also be appreciated that the nodes displayed in the multi-facetted window 304 may change as a function of data stored in the object model and/or developer input. For example, a developer may create additional nodes to be displayed within the multi-facetted window 304 and/or delete nodes from the multi-facetted window 304.

Figure 4:
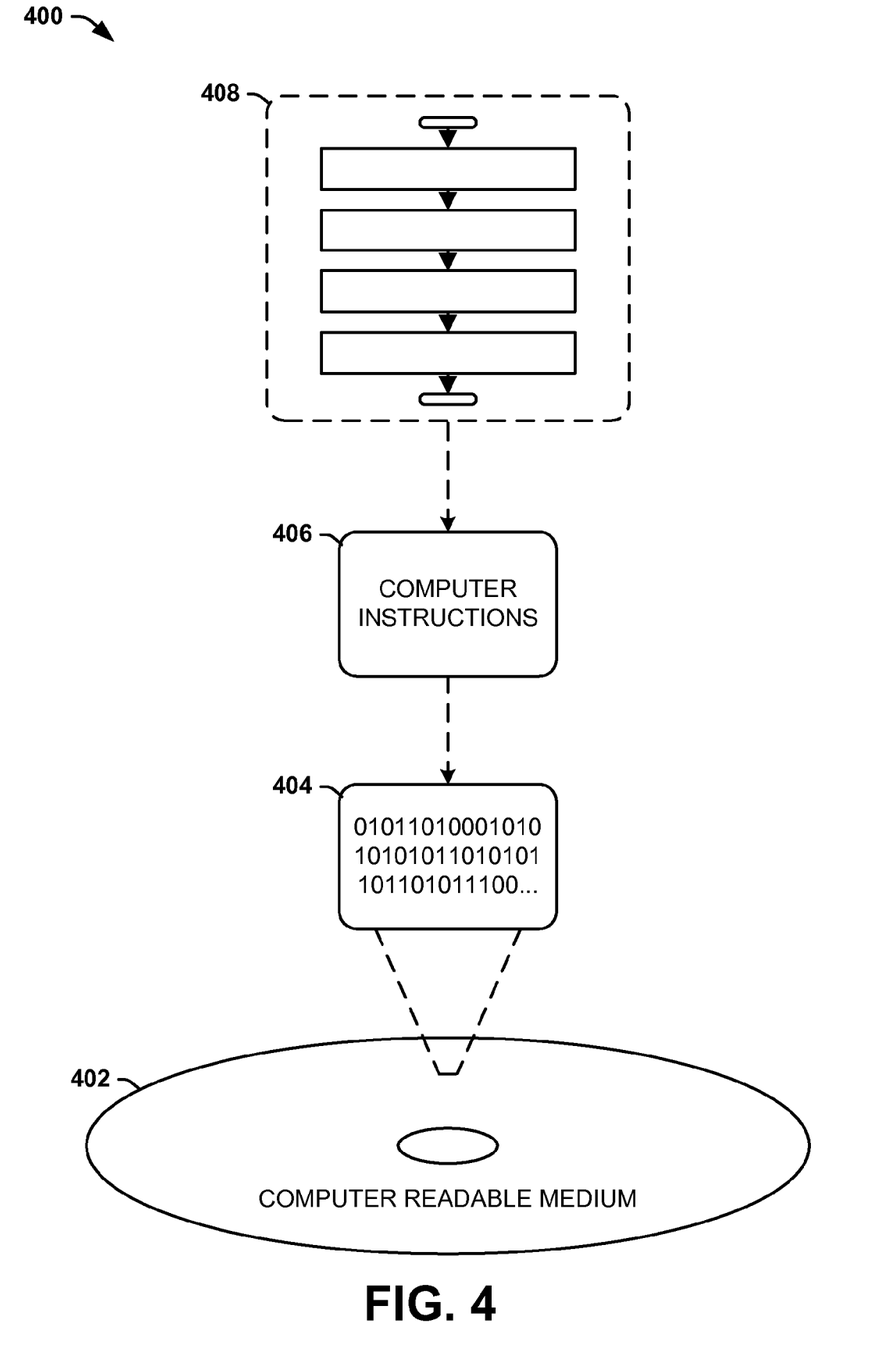
FIG. 4 is an illustration of an exemplary computer-readable medium comprising process or-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to one or more of the principles set forth herein. In one such embodiment 400, the processor-executable instructions 406 may be configured to perform a method, such as the exemplary method 1 of FIG. 1, for example. In another such embodiment, the processor-executable instructions 406 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 5:
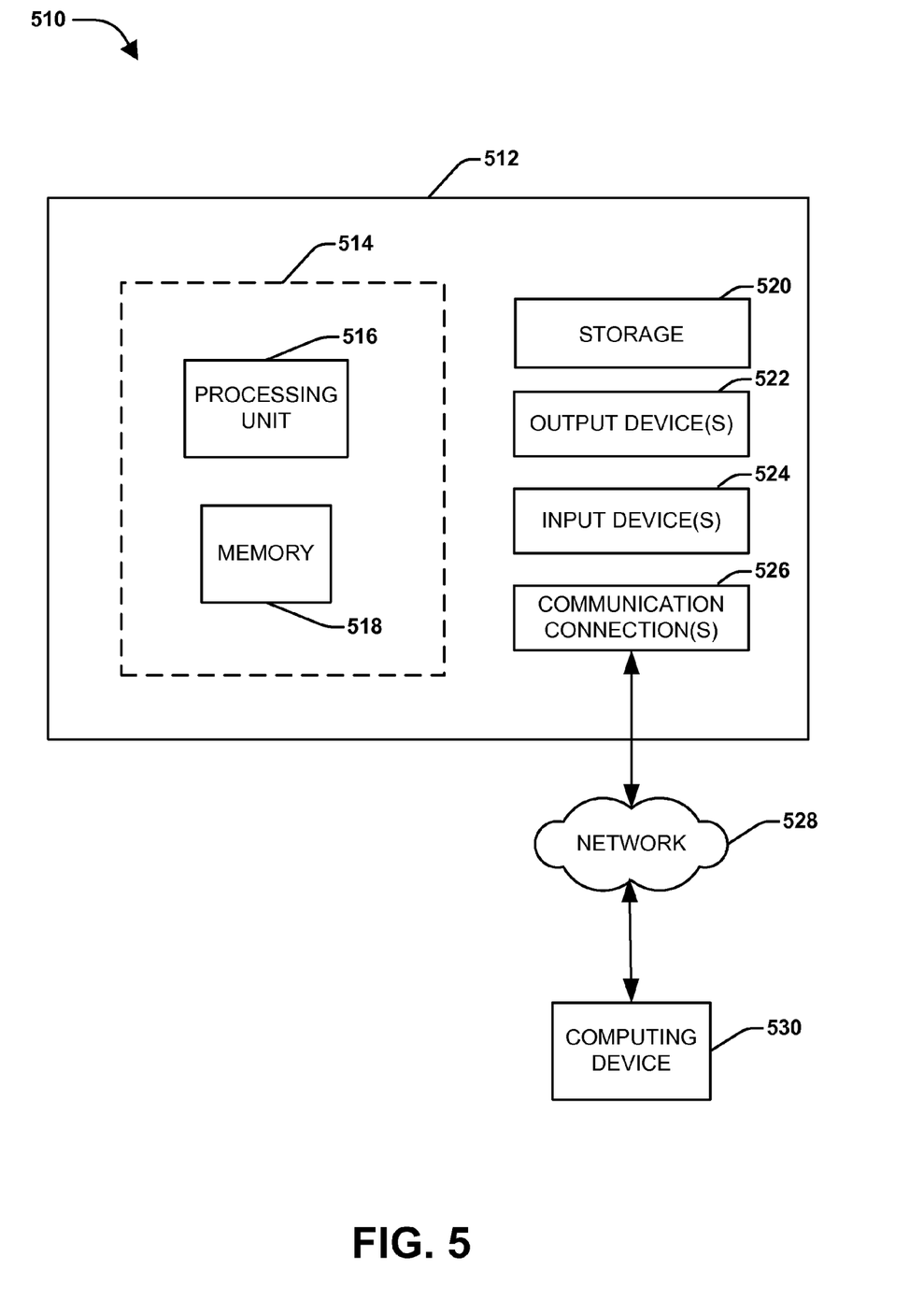
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 510 comprising a computing device 512 configured to implement one or more embodiments provided herein. In one configuration, computing device 512 includes at least one processing unit 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Any such computer storage media may be part of device 512.

Device 512 may also include communication connection(s) 526 that allows device 512 to communicate with other devices. Communication connection(s) 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection(s) 526 may include a wired connection or a wireless connection. Communication connection(s) 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device(s) 524 such as keyboard, mouse, pen, voice input device, touch input device, infrared cameras, video input devices, and/or any other input device. Output device(s) 522 such as one or more displays, speakers, printers, and/or any other output device may also be included in device 512. Input device(s) 524 and output device(s) 522 may be connected to device 512 via a wired connection, wireless connection, or any combination thereof. In one embodiment, an input device or an output device from another computing device may be used as input device(s) 524 or output device(s) 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   receiving a request from a development environment to retrieve data from an object store, the request comprising an identifier for identifying a retrieval method to be used to retrieve the data from the object store and a parameter indicative of a version of an object model, associated with the object store, configured to execute the retrieval method to retrieve the data from the object store;
   neutralizing a property of the request to generate an abstracted request such that the abstracted request is executable via a processor architecture of the object model, the abstracted request comprising the identifier and the parameter;
   retrieving the retrieval method identified by the identifier in the abstracted request;
   determining an available version of the object model;
   comparing the available version of the object model to the version of the object model indicated by the parameter in the abstracted request;
   loading, using a processing unit, a first adapter into the object model responsive to the comparing when the available version of the object model does not correspond to the version of the object model indicated by the parameter to generate a modified object model comprising the first adapter; and
   invoking the modified object model to execute the retrieval method.

2. The method of claim 1, the property related to a configuration detail of the development environment.

3. The method of claim 1, the property related to a processor architecture targeted by the development environment.

4. The method of claim 3, the processor architecture targeted by the development environment different than the processor architecture of the object model.

5. The method of claim 1, the request not executable via the processor architecture of the object model prior to the neutralizing.

6. The method of claim 1, the request not executable via the processor architecture of the object model due to the property of the request.

7. The method of claim 1, comprising invoking the first adapter to receive the abstracted request at the modified object model.

8. The method of claim 7, comprising reinvoking the first adapter responsive to receiving a second request comprising the parameter.

9. The method of claim 1, the request targeted to a 32-bit processor architecture and the processor architecture of the object model being a 64-bit processor architecture.

10. The method of claim 1, comprising:
   determining, when a second request is received, whether to load a second adapter based upon at least one characteristic of the first adapter and at least one parameter of the second request.

11. The method of claim 10, comprising:
not loading the second adapter when the at least one characteristic of the first adapter corresponds to the at least one parameter of the second request.

12. A system, comprising:
a processing unit; and
memory comprising instructions that when executed by the processing unit perform a method, comprising:
receiving a request from a development environment to retrieve data from an object store, the request comprising an identifier for identifying a retrieval method to be used to retrieve the data from the object store and a parameter indicative of a version of an object model, associated with the object store, configured to execute the retrieval method to retrieve the data from the object store;
neutralizing a property of the request to generate an abstracted request such that the abstracted request is executable via a processor architecture of the object model, the abstracted request comprising the identifier and the parameter;
retrieving the retrieval method identified by the identifier in the abstracted request;
determining an available version of the object model;
comparing the available version of the object model to the version of the object model indicated by the parameter in the abstracted request;
loading a first adapter into the object model responsive to the comparing when the available version of the object model does not correspond to the version of the object model indicated by the parameter to generate a modified object model comprising the first adapter; and
invoking the modified object model to execute the retrieval method.

13. The system of claim 12, comprising transmitting the retrieval method to the modified object model.

14. The system of claim 12, the request targeted to a processor architecture that is different than the processor architecture of the object model.

15. The system of claim 12, comprising serializing the data, retrieved responsive to the invoking, into at least one of a version neutral data structure or a processor architecture neutral data structure to generate serialized data.

16. The system of claim 15, comprising de-serializing the serialized data based upon a characteristic of the development environment.

17. The system of claim 12, the retrieving comprising:
determining an availability of the retrieval method identified by the identifier;
retrieving the retrieval method responsive to the retrieval method being available; and
retrieving a general retrieval method, not specific to the abstracted request, when the retrieval method is not available.

18. The system of claim 17, the retrieving comprising:
retrieving one or more data commands identified by the identifier when the retrieval method is not available; and
combining the one or more data commands with the general retrieval method to generate a request-specific method to be executed by the modified object model.

19. A computer readable medium, excluding signals, comprising instructions that when executed perform a method, comprising:
receiving a request from a development environment to retrieve data from an object store, the request comprising an identifier for identifying a retrieval method to be used to retrieve the data from the object store and a parameter indicative of a version of an object model, associated with the object store, configured to execute the retrieval method to retrieve the data from the object store;
neutralizing a property of the request to generate an abstracted request such that the abstracted request is executable via a processor architecture of the object model, the abstracted request comprising the identifier and the parameter;
retrieving the retrieval method identified by the identifier in the abstracted request;
determining an available version of the object model;
comparing the available version of the object model to the version of the object model indicated by the parameter in the abstracted request;
loading a first adapter into the object model responsive to the comparing when the available version of the object model does not correspond to the version of the object model indicated by the parameter to generate a modified object model comprising the first adapter; and
invoking the modified object model to execute the retrieval method.

20. The computer readable medium of claim 19, a processor architecture targeted by the development environment different than the processor architecture of the object model.

* * * * *